Patented Feb. 6, 1934

1,946,327

UNITED STATES PATENT OFFICE 1,946,327

METHOD OF MANUFACTURING A MAGNESIA CEMENT

Ryosaku Matsuura, Shotokugai, Dairen, Manchuria, China, assignor to Minami Manshu Tetsudo Kabushiki Kaisha, Dairen, Manchuria, China, a corporation of Japan No Drawing. Application February 14, 1930
Serial No. 428,517

2 Claims. (Cl. 106—24)

This invention relates to the magnesia cement which consists of magnesium oxide, magnesium sulphite and various aggregates and fillers. The object thereof is to obtain the magnesia cement which may be used by simply mixing with water and which sets firmly in a few hours into cement of extra strength. After hardening, it resists the work of elements, is resilient and is free from cracking and shrinking.

For magnesium oxide light burnt magnesite is used. It is prepared in the usual manner by burning the natural magnesite at a temperature of about 800° C. and then grinding the same. The light burnt magnesite usually contains 85% of magnesium oxide.

The magnesium sulphite, which is the second important material, is prepared from sulphur dioxide and light burnt magnesite as follows:—

The light burnt magnesite is suspended in water by stirring. The sulphur dioxide produced by burning the sulphur ore or other sulphur containing ores is then passed into water until the solution shows the neutral reaction. The ordinary magnesium sulphite thus prepared is almost insoluble and easily separated from the solution by settling. It is then spread out to dry and then is ground.

These two fundamental materials are then mixed together and one or more aggregates or fillers such as silicious substances, saw-dust, cork-dust, asbestos fibres are added thereto together with colouring materials. The proportions of the above ingredients vary according to the purpose such as flooring, stucco, artificial stones, etc. The qualities and proportions of the aggregates or fillers used also vary according to the desired hardness, resiliency, finish, color, etc.

*Per example.*—The mixture of 100 parts of light burnt magnesite, 50 to 150 parts of magnesium sulphite and 200 to 300 parts of finely powdered silica imparts a beautiful finish of a surpassing quality and strength only equal to that of marble.

The oxychloride cement or Sorel cement may be very strong for a time, but owing to the magnesium chloride contained therein, it can not resist the work of elements and is easy to crack or become stained by water or dampness. Also, it is inconvenient to use magnesium chloride.

Lately, many kinds of magnesia cements have been placed on markets, such as magnesium oxide and magnesium carbonate, magnesium oxide and acid natrium carbonate, or magnesium oxide and magnesium sulphate. Some of these are long in setting, while the others having an unfinished appearance, are apt to crack or effloresce. Besides, they are expensive. However, I have discovered that by the use of lightly burned magnesite for the production of both of the principal ingredients, namely magnesium oxide and magnesium sulphite and mixing these ingredients together approximately in the proportions given herein, a cement is produced which hardens in a comparatively short time, is free from cracks and is quite inexpensive.

The magnesia cement according to this invention forms a plastic mass by simply mixing with water, sets in a few hours into a hard stone-like substance and forms the basic magnesium sulphite. It can be applied inexpensively to floors, stucco, artificial stones and other constructions. It has all the merits of the above mentioned Sorel cement. For example, it can be applied to wood, concrete, or metal.

I claim:—

1. Magnesia cement consisting of light burned magnesite containing 85% of magnesium oxide, and almost insoluble magnesium sulphite.

2. Magnesia cement consisting of light burned magnesite containing 85% of magnesium oxide, magnesium sulphite, filler, coloring matter and aggregates.

RYOSAKU MATSUURA.